United States Patent
Koenigs et al.

(12) 
(10) Patent No.: US 10,844,975 B2
(45) Date of Patent: Nov. 24, 2020

(54) SLIDE THROUGH FITTING

(71) Applicant: Parker-Hannifin Corporation, Cleveland, OH (US)

(72) Inventors: Kevin A. Koenigs, Prairie View, IL (US); Bruce Besch, Andover, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 346 days.

(21) Appl. No.: 15/613,876

(22) Filed: Jun. 5, 2017

(65) Prior Publication Data

US 2017/0348519 A1 Dec. 7, 2017

Related U.S. Application Data

(60) Provisional application No. 62/346,006, filed on Jun. 6, 2016.

(51) Int. Cl.
*F16L 27/087* (2006.01)
*F16L 1/00* (2006.01)

(52) U.S. Cl.
CPC .................... *F16L 1/00* (2013.01)

(58) Field of Classification Search
CPC ..... F16L 15/02; F16L 27/0849; F16L 27/087; F16L 27/093; F16L 27/12
USPC .......................... 285/185, 182, 190
See application file for complete search history.

(56) References Cited

U.S. PATENT DOCUMENTS

| | | | | |
|---|---|---|---|---|
| 397,981 A | * | 2/1889 | Haggett | F16L 27/12 285/106 |
| 462,222 A | * | 10/1891 | Shepard | F16L 27/093 285/190 |
| 729,872 A | * | 6/1903 | Keller | F16L 27/12 285/302 |
| 1,553,184 A | * | 9/1925 | Mueller | F16N 21/04 285/190 |
| 1,949,961 A | * | 3/1934 | Hansen | F16L 27/093 277/360 |
| 2,044,052 A | * | 6/1936 | Broadley | F16L 27/093 285/179 |

(Continued)

FOREIGN PATENT DOCUMENTS

| | | | | |
|---|---|---|---|---|
| EP | 2730919 A1 | 5/2014 | | |
| FR | 1473213 A | * | 3/1967 | ............ F16L 27/093 |
| GB | 2035493 A | * | 6/1980 | ............ F16L 27/093 |

*Primary Examiner* — David Bochna
(74) *Attorney, Agent, or Firm* — Renner, Otto, Boisselle & Sklar, LLP (57) ABSTRACT

A fitting assembly includes a fitting and a tube. The fitting has a fitting body having a straight through hole and an attachment or base port, connected to the through hole by a first passageway generally perpendicular to the through hole. The tube has an outer diameter smaller than the through hole allowing a first end of the tube to pass through the through hole. A seal is positioned in one of a circumferential slot in the tube and a circumferential slot in the through hole of the fitting body, the seal sealing a second end of the tube to the fitting body. A cover is sealingly attached to the first end of the through hole. One of the cover and the tube has a portion that extends into an intersection of the through hole and the first passageway, the portion having an aperture that prevents blockage between the attachment or base port and the second end of the through hole.

17 Claims, 6 Drawing Sheets

(56) References Cited

U.S. PATENT DOCUMENTS

| | | | | |
|---|---|---|---|---|
| 2,459,643 A * | 1/1949 | Hartley | F16L 27/093 | 285/190 |
| 2,790,426 A * | 4/1957 | Mueller | F16L 27/093 | 254/93 R |
| 2,845,282 A * | 7/1958 | Mueller | F16L 27/093 | 285/137.11 |
| 2,872,217 A * | 2/1959 | May | F16L 27/093 | 277/362 |
| 3,007,485 A * | 11/1961 | Barker | F16K 3/26 | 285/190 |
| 3,088,759 A * | 5/1963 | Corsette | F16L 27/093 | 277/553 |
| 3,125,360 A * | 3/1964 | Ulrich | F16L 27/093 | 285/190 |
| 3,627,355 A * | 12/1971 | Reddy | F16L 27/093 | 285/50 |
| 3,640,553 A * | 2/1972 | Blatt | F16L 27/093 | 285/277 |
| 3,981,329 A * | 9/1976 | Wohlwend | F16L 39/00 | 137/615 |
| 4,823,835 A * | 4/1989 | Chu | F16L 27/093 | 137/557 |
| 5,248,250 A * | 9/1993 | Adachi | B29C 45/7312 | 285/190 |
| 5,713,609 A * | 2/1998 | Mascola | F16L 27/093 | 285/121.3 |
| 6,056,325 A * | 5/2000 | Bernard | F16L 27/093 | 285/190 |
| 8,006,367 B1 | 8/2011 | Best | | |
| 2005/0242575 A1 | 11/2005 | Ichimura et al. | | |
| 2006/0150729 A1 * | 7/2006 | Nestle | F16L 27/093 | 73/201 |
| 2008/0012294 A1 * | 1/2008 | Cheng | F16L 27/093 | 285/190 |
| 2008/0238092 A1 * | 10/2008 | Chen | B25C 1/04 | 285/190 |
| 2008/0283789 A1 | 11/2008 | Rubio et al. | | |
| 2009/0245926 A1 * | 10/2009 | Wei | F16L 27/093 | 403/65 |
| 2012/0223520 A1 | 9/2012 | Graham | | |
| 2018/0112781 A1 * | 4/2018 | Bohner | F16L 27/093 | |

* cited by examiner

SLIDE THROUGH FITTING

TECHNICAL FIELD

The present invention relates generally to a fitting, and more particularly to a slide through port fitting having particular utility in applications such as a cylinder assembly having fixed porting points built in to the cylinder design.

BACKGROUND

Some traditional fittings are specified to be tightened or torqued once during initial assembly. This can be difficult in tight spaces depending on the application. Any disassembly or maintenance issues thereafter typically requires fittings, sometimes tubing, to be replaced due to the nature of deformation experienced by fitting components during the initial installation process. Other traditional tubing designs, like face seals and flared tubing, require precise tubing lengths. If proper lengths are not met, leakage could occur at the joints. Most times overtightening is used to overcome these short falls to create the seal. This approach causes undue stress on the direct and indirect components potentially leading to premature failure.

SUMMARY

At least one advantage over the prior art is provided by a fitting comprising: a fitting body having a straight through hole and an attachment or base port, the through hole having a first end and a second end, the attachment or base port connected to the through hole by a first passageway generally perpendicular to the through hole; a seal positioned in the through hole of the fitting body at a location offset from the second end of the through hole; a cover sealingly attachable to the first end of the through hole, the cover including a portion extending into an intersection of the through hole and the first passageway, the portion having an end that provides a register surface for attachment of a tube to the fitting, the portion having an aperture that prevents blockage between the attachment or base port and the second end of the through hole.

At least one advantage over the prior art is provided by a fitting assembly comprising: a fitting body having a through hole and an attachment or base port, the through hole having a first end and a second end; a tube having a first end and a second end; the tube having a geometry allowing the first end of the tube to pass through the through hole of the fitting body, the second end to the tube sealing in the fitting body, the first end of the tube extending from the second end of the through hole; a cover sealingly attached to the first end of the through hole; the fitting assembly fluidly connecting the tube and the attachment or base port of the fitting body.

At least one advantage over the prior art is provided by a method of fluidly connecting a tube to a fitting, the method comprising the steps of: providing a fitting body having a through hole and an attachment or base port, the through hole having a first end and a second end; providing a tube having a first end and a second end; passing the first end of the tube through the through hole of the fitting body until the second end to the tube seals in the fitting body such that the tube extends from the second end of the through hole; sealing the first end of the through hole with a cover to fluidly connect the tube to the attachment or base port of the fitting body.

At least one advantage over the prior art is provided by a cylinder assembly comprising: a cylinder body having a fluid port; a manifold having a fluid port; a fitting assembly comprising a fitting body having a through hole and an attachment or base port connected to the fluid port of the cylinder body, the through hole having a first end and a second end, a tube having a first end and a second end, the tube having a geometry allowing the first end of the tube to pass through the through hole of the fitting body, the second end to the tube sealing in the fitting body, the tube extending from the second end of the through hole with the first end of the tube sealingly mating with the fluid port of the manifold, a cover sealingly attached to the first end of the through hole, the fitting assembly fluidly connecting the fluid port of the cylinder to the fluid port of the manifold.

At least one advantage over the prior art is provided by a cylinder assembly comprising: a cylinder body having a first fluid port and a second fluid port; a manifold having a first fluid port and a second fluid port; a first fitting assembly comprising a first fitting body having a through hole and an attachment or base port connected to the first fluid port of the cylinder body, the through hole having a first end and a second end, a first tube having a first end and a second end, the first tube having a geometry allowing the first end of the first tube to pass through the through hole of the first fitting body, the second end to the first tube sealing in the first fitting body, the first tube extending from the second end of the through hole of the first fitting body with the first end of the first tube sealingly mating with the first fluid port of the manifold, a first cover sealingly attached to the first end of the through hole of the first fitting body, the first fitting assembly fluidly connecting the first port of the cylinder to the first port of the manifold; a second fitting assembly comprising a second fitting body having a through hole and an attachment or base port connected to the second fluid port of the cylinder body, the through hole having a first end and a second end, a second tube having a first end and a second end, the second tube having a geometry allowing the first end of the second tube to pass through the through hole of the second fitting body, the second end of the second tube sealing in the second fitting body, the second tube extending from the second end of the through hole of the second fitting body with the first end of the second tube sealingly mating with the second fluid port of the manifold, a second cover sealingly attached to the first end of the through hole of the second fitting body, the second fitting assembly fluidly connecting the second port of the cylinder to the second port of the manifold.

BRIEF DESCRIPTION OF THE DRAWINGS

An embodiment of this invention will now be described in further detail with reference to the accompanying drawings, in which.

DETAILED DESCRIPTION OF THE DRAWINGS

Figure 5:
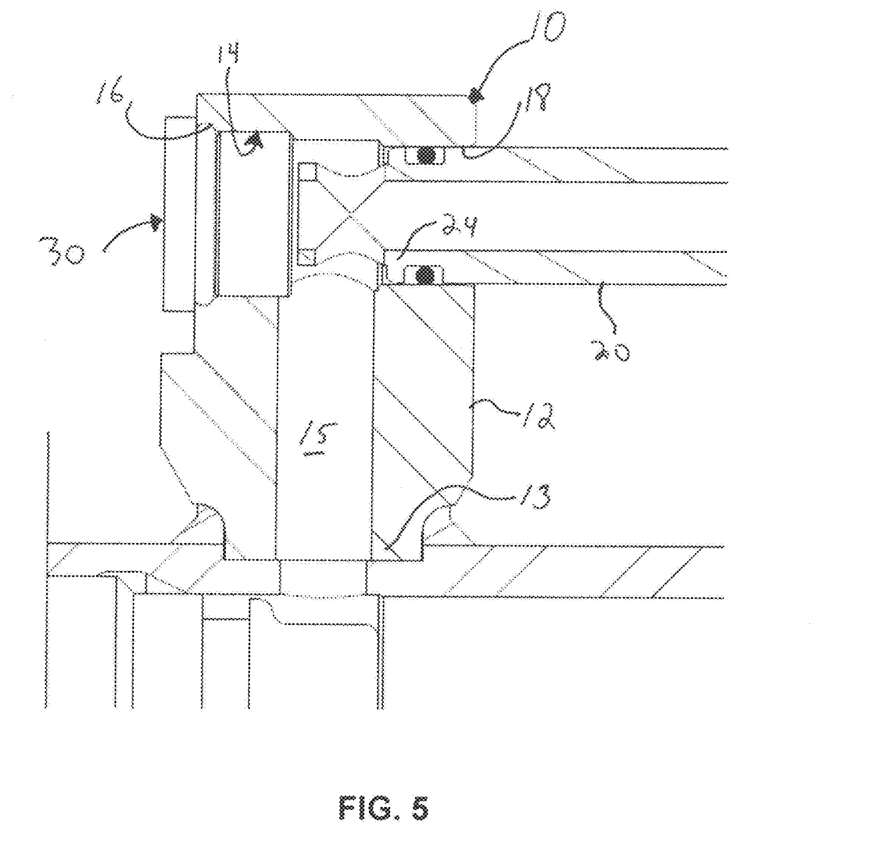
FIG. 5 shows a partial detail view of FIG. 3 showing the slide through port fitting and tubing connection of the cylinder assembly.
Figure 7:
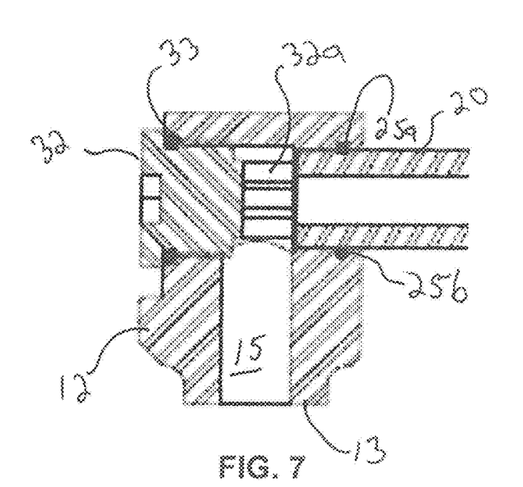
FIG. 7 shows a cross-sectional view of a slide through port fitting and tube assembled in accordance with another embodiment of the invention.
Figure 8:
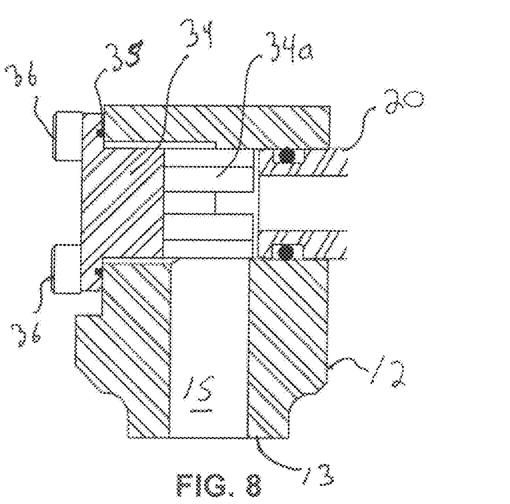
FIG. 8 shows a cross-sectional view of a slide through port fitting and tube assembled in accordance with another embodiment of the invention.
Figure 9:
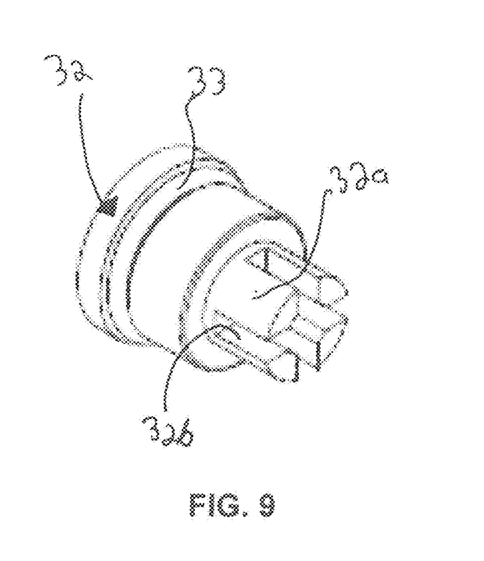
FIG. 9 shows a perspective view of an end fitting used in FIG. 7.
Figure 10:
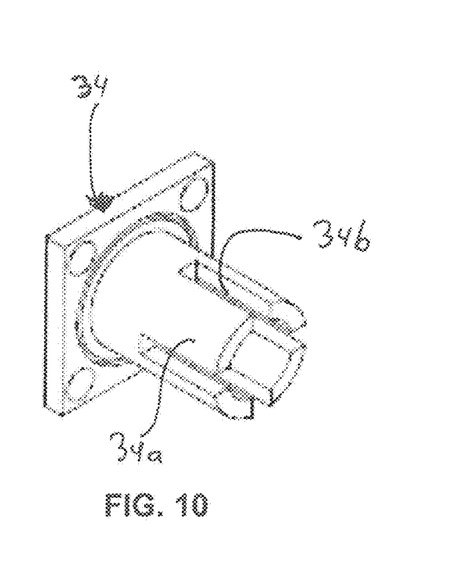
FIG. 10 shows a perspective view of an end fitting used in FIG. 8.
Figure 11:
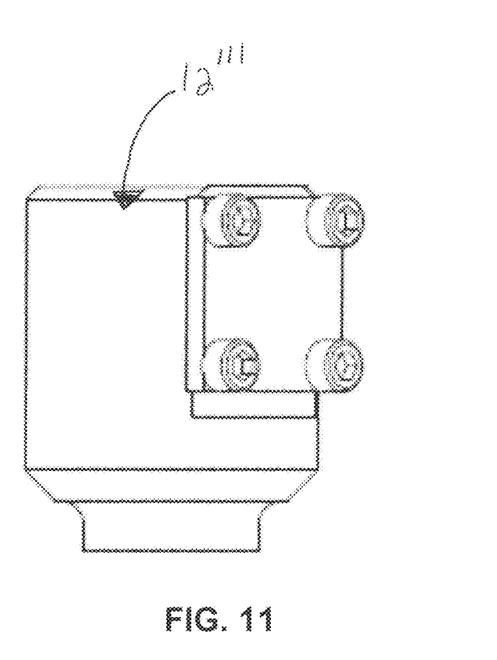
FIG. 11 shows a perspective view of the port fitting assembly used in FIG. 8.

Referring now to FIG. 5, an embodiment of the invention is shown as a fitting or port boss assembly 10 including a fitting and connecting tubing, the fitting having a fitting body or port boss body 12 that includes an attachment or base port 13 and a straight through hole 14. The fitting body 12 is made of a suitable material for the pressure and fluid in the application in which it is to be used as is known in the art. The attachment or base port 13 leads into a fluid passageway 15 formed transverse to the straight through hole 14 so that the base port is connected to the through hole by the fluid passageway 15 generally perpendicular to the through hole. The through hole 14 has a first end 16 which is configured to allow a first end 22 of a tube 20 to pass through, and the through hole 14 has a second end 18 of the through hole 14 which is configured to mate with a second end 24 of the tube 20 when the tube 20 is assembled to the port boss body 12. The through hole 14 is positioned on or near the same centerline of the tube for the necessary connecting tubing 20 when the system is assembled. Once the second end 24 of the tube 20 is properly positioned in the second end 18 of the through hole 14 (and the first end 22 of the tube is sealingly mated to a corresponding port), a plug or cover 30 is sealingly attached to the first end 16 of the through hole 14 and thereby is used to seal the first end 16 of the through hole 14 to prevent leakage. This plug or cover 30 could be any suitable design such as a traditional threaded plug 32 and o-ring seal 33 (as shown in FIGS. 7 and 9) or a plate 34 with an o-ring seal 35 mounted with threaded fasteners 36 (as shown in FIGS. 8, 10 and 11). The plugs or covers 32, 34 each may include a portion extending into an intersection of the through hole and the perpendicular fluid passageway 15. For example, such extending portion may be configured as projections 32a, 34a respectively, the projections being provided at an end of the extending portion which extend into the through hole 14 (as shown in FIGS. 7-10). The extending portion with the end projections provides a register surface for attachment of the connecting tubing, and has apertures 32b, 34b that prevent blockage between the base port and the second end 18 of the through hole 14.

Figure 1:
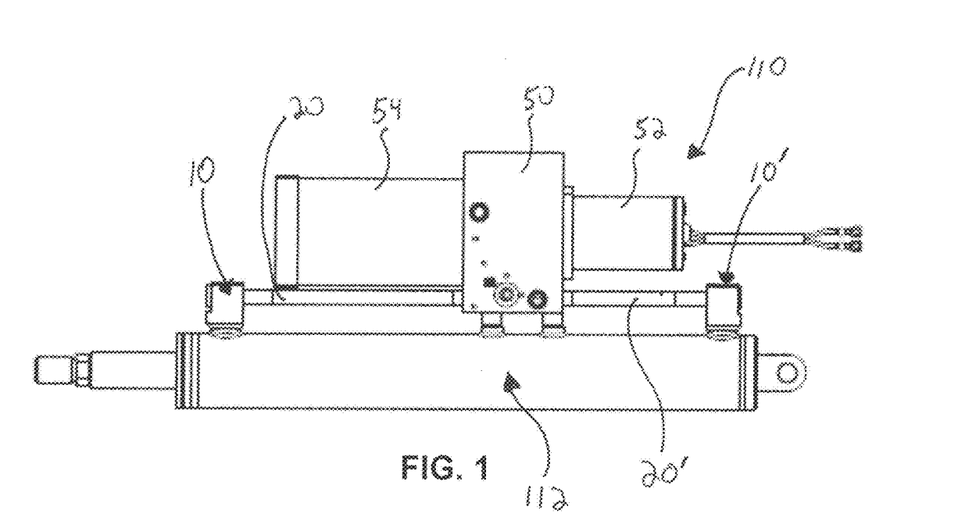
FIG. 1 shows a side view of a cylinder assembly incorporating the slide through port fittings in accordance with an embodiment of the invention.
Figure 2:
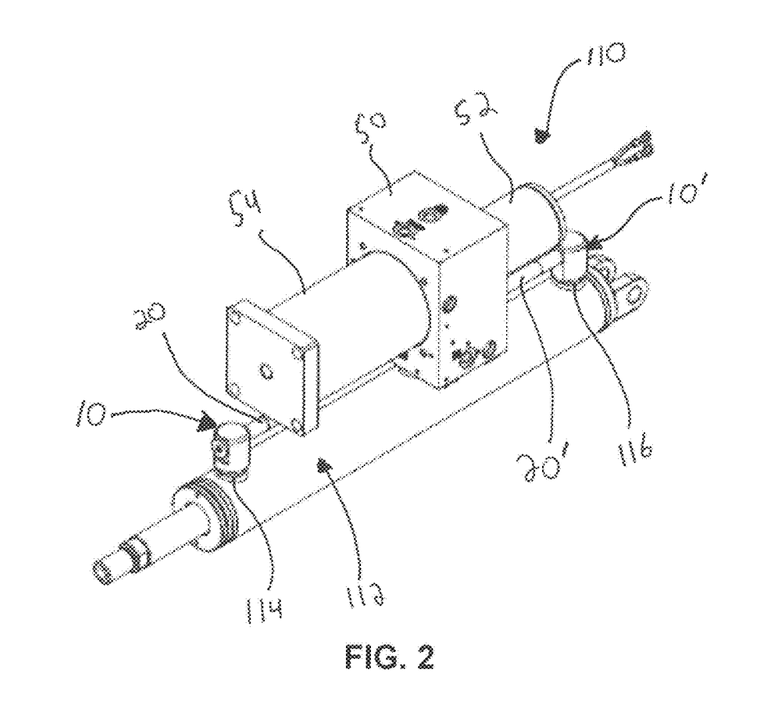
FIG. 2 shows a perspective view of the cylinder assembly of FIG. 1.
Figure 3:
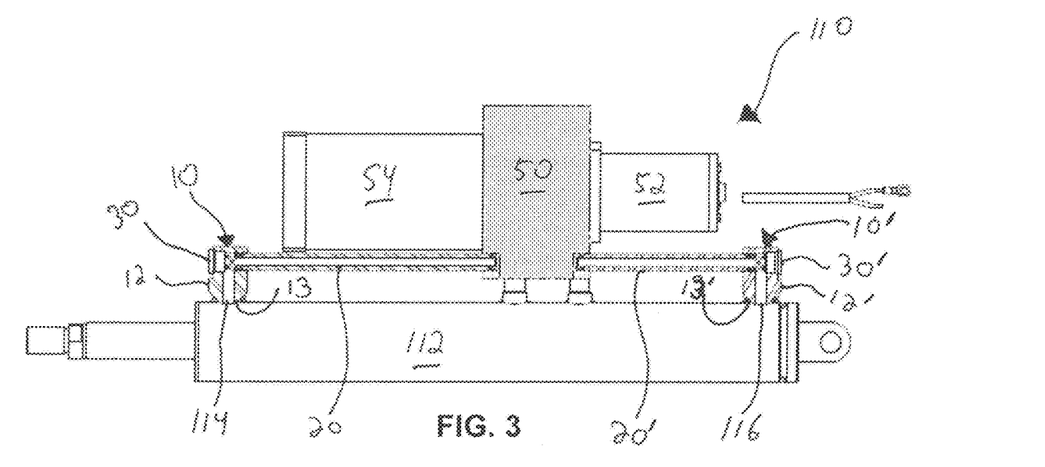
FIG. 3 shows a side view of the cylinder assembly of FIG. 1 with the slide through port fittings and associated tubing shown in cross-section.
Figure 4:
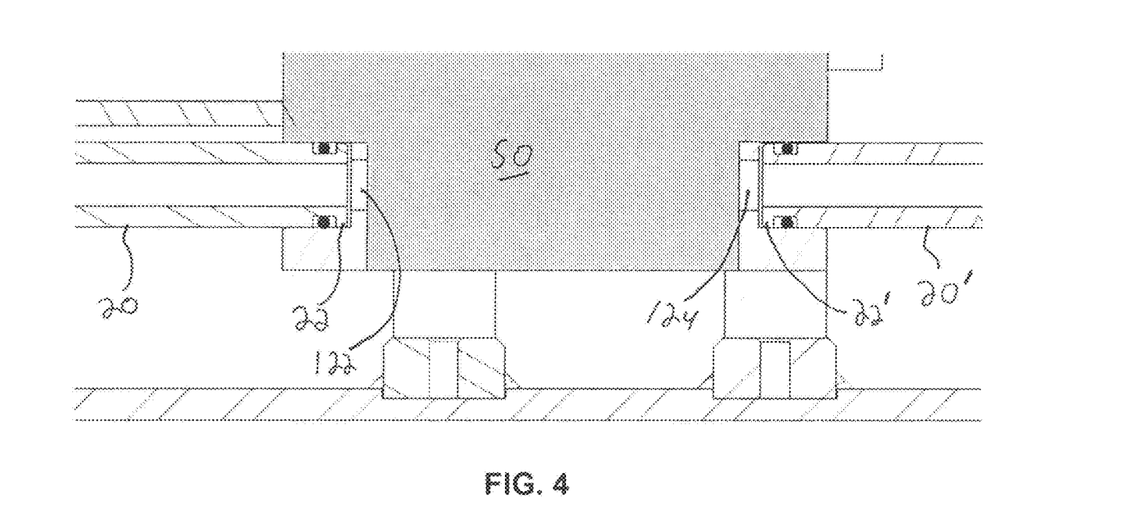
FIG. 4 shows a partial detail view of FIG. 3 showing the tubing connection to a manifold of the cylinder assembly.

The port boss or fitting assemblies 10 have particular application in designs having two (or more) fixed points that are immoveable and difficult to access. Referring now to FIGS. 1-3, the port boss or fitting assemblies are shown as part of a cylinder assembly 110. The cylinder assembly 110 comprises a cylinder body 112 having a first port 114 connected to a first port boss assembly 10 and a second port 116 connected to a second boss assembly 10'. The details of the connection of the first and second port boss assemblies 10, 10' are as described with reference to the description of FIG. 5 with the components of the second port boss designated with their corresponding first number and the symbol "'". The cylinder assembly 110 includes a fluid manifold 50 shown having an electric motor 52 and a fluid reservoir 54 attached thereto. In assembling the fluid connections of the cylinder assembly 110, the port boss fitting bodies 12, 12' are attached to the ports 114, 116 of the cylinder 112 by a threaded connection, welding, or any appropriate connection known in the prior art. The tubes 20, 20' are slid through the fitting bodies 12, 12' until the second ends 24, 24' of the tubes 20, 20' are sealingly engaged by fluid ports 114, 116 of the cylinder and the first ends 22, 22' of the tubes 20, 20' are sealingly engaged by fluid ports 122, 124 of the fluid manifold 50 (as best shown in FIG. 4). No tightening of connectors or attachments are required to connect the tube 20, 20' to the manifold port 122, 124. It is also contemplated that it may be necessary to slide the tubes partially through the fitting bodies 12, 12' and then mount the manifold 50/manifold assembly (50+52+54) to the cylinder 112 and then sliding the tubes 20, 20' into their final sealed positions. The plugs 30, 30' are then positioned into the fitting bodies 12, 12' to fluidly connect the cylinder ports 114, 116 to the manifold ports 122, 124, respectively.

Figure 12:
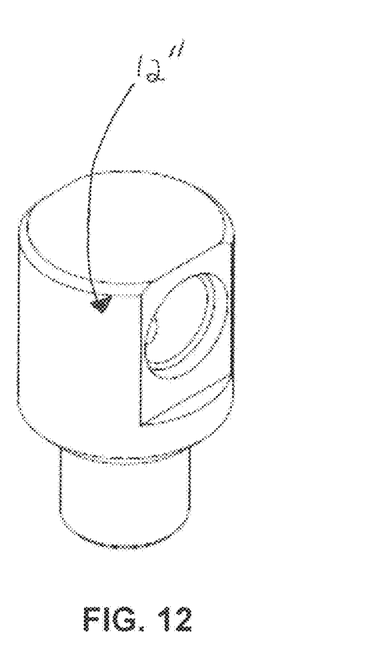
FIG. 12 shows a perspective view of another embodiment of an end fitting in accordance with another embodiment of the invention.
Figure 13:
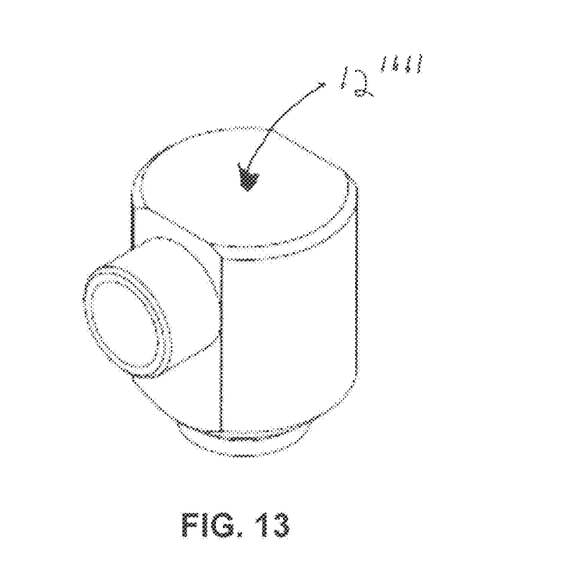
FIG. 13 shows a perspective view of another embodiment of an end fitting in accordance with another embodiment of the invention.

This slide-through port boss fitting concept provides broad design flexibility. The current design also accommodates a fitting body or port boss body 12 that is welded to its base member at the base port 13, precluding the need for an additional fitting and the excess height that can result (welded versions of the port boss body 12 are shown at least in FIGS. 7-8, 11 and 13). This slide-through concept could also be expanded to cover a more standard fitting offering. Fittings that have at the base port a threaded base or other connection means to the required assembly (cylinders, valves, etc.) may incorporate this design (such as the port boss body 12" shown in FIG. 12). The connection point between the tubing and port boss fitting requires an o-ring seal. This seal could be incorporated into the fitting or the tubing. Traditional tubing and connection points can incorporate geometry of the slide-through fitting or port boss design (like compression style).

Figure 6A:
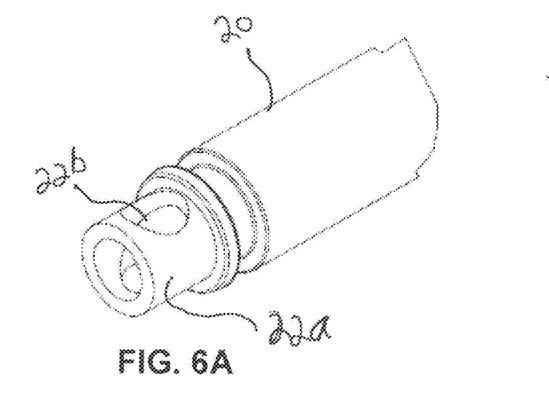
FIG. 6A shows a perspective view of an end of a tubing connection usable in the slide through port fitting.
Figure 6B:
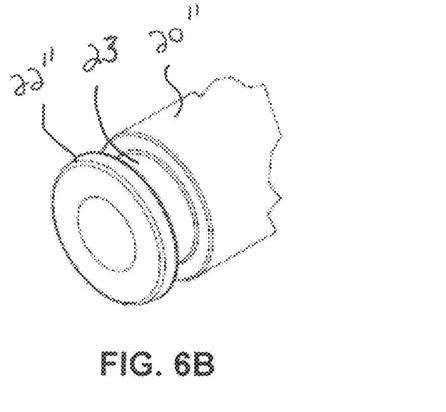
FIG. 6B shows a perspective view of an end of another tubing connection usable in the slide through port fitting.

The through hole 14 allows the user to push the tubing 20 through the fitting body 12 to accommodate any space restrictions in the application and preclude the need to rotate either the port boss body 12, or require the use of specialized bulkhead fittings that will ensure seal-tight connection after rotating to install tubing 20. The tubing design would be such that installation could be either partially or completely pass through the through hole 14 in the fitting body 12, enough to allow the user to properly assemble mating parts. Variations of the tube ends 22, 24 are shown in the FIGS with the tube end 22 in FIGS. 5 and 6A having a smaller diameter projection 22a having a hole 22b therein to promote fluid passage through the fluid passageway 15. The tube end 22" in FIGS. 6B and 8 include a circumferential recess or slot 23 for an o-ring 23a whereas the tube end 22'"

shown in FIG. 7 does not include an o-ring recess as a circumferential o-ring recess or slot 25a is in the port boss body 12 for receiving an o-ring 25b.

The slide-through nature of the design allows designers and the like to build fixed or static designs that use tubing to connect communication ports and know that the unit can be assembled and maintained without disrupting the integrity of the sealing points. In particular the slide-through port boss fitting/tubing design provides: 1) Improved unit integrity fewer parts, fewer leak points; 2) Reduced assembly time/ease of product assembly; 3) Improved and enhanced maintenance capabilities attached system (i.e. can be removed w/o interrupting the seal integrity of the cylinder); 4) Component (fitting) elimination reduced cost/reduced component inventory; 5) Design flexibility designers will have more flexibility for areas traditional fittings will not work; i.e. tight spaces; fixed (like welded) location points (fixed envelope).

The concept also allows for the overall tubing OD to be larger than the through hole 14 as long as the ends of the tube 20 are the same size as the fitting geometry and long enough to allow proper installation of mating parts in the overall assembly 10. In such a configuration, the tube 20 would not be able to pass through the through hole 14.

Figure 14:
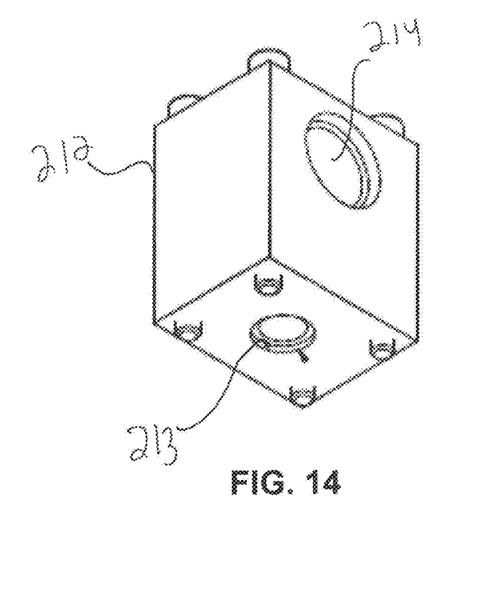
FIG. 14 shows a perspective view of another embodiment of an end fitting in accordance with another embodiment of the invention.
Figure 15:
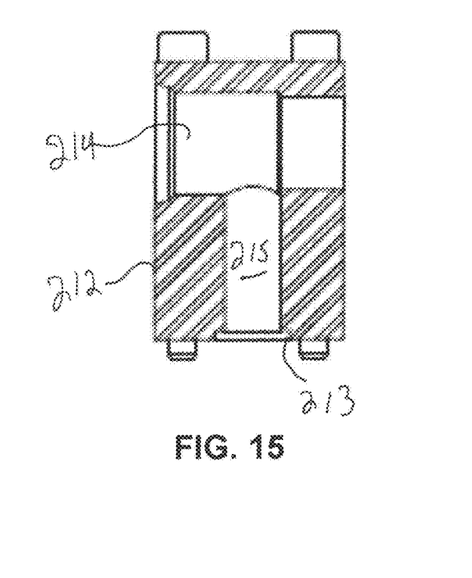
FIG. 15 shows a cross-sectional view of the end fitting of FIG. 13.

Referring now to FIG. 14 (perspective view) and FIG. 15 (cross-sectional view), another embodiment is shown as a fitting body 212. The fitting body 212 is comparable to the fitting bodies 12, 12' (etc.), although configured having rectangular solid shape. Similar to previous embodiments, the fitting body 212 has an attachment or base port 213 and a straight through hole 214. The fitting body 212 is made of a suitable material for the pressure and fluid in the application in which it is to be used as is known in the art. The attachment or base port 213 leads into a fluid passageway 215 formed transverse to the straight through hole 214 so that the base port is connected to the through hole by the fluid passageway 215 generally perpendicular to the through hole. The through hole 214 of the fitting body 212 can accommodate a tube and a plug or cover comparably as in the previous embodiments.

Figure 16:
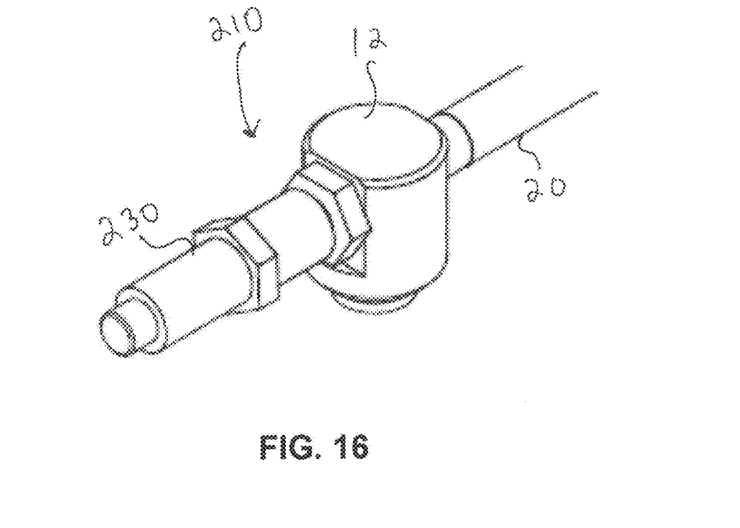
FIG. 16 shows a perspective view of a fitting assembly in which a cover attached to the fitting comprises a sensor.

Referring now to FIG. 16, another embodiment is shown as a fitting assembly 210. Fitting assembly 210 may include the fitting body 12 (or any other fitting body configuration in accordance with the previous embodiments), which receives the tube 20. In this particular embodiment, the plug or cover comprises a sensor 230. The sensor 230 may be a pressure sensor, temperature sensor, or a sensor of another suitable parameter as may be warranted for any particular application.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

The invention claimed is:

1. A fitting comprising:
a fitting body having a straight through hole and a base port, the through hole having a first end and a second end, the base port connected to the through hole by a first passageway generally perpendicular to the through hole;
a seal positioned in the through hole of the fitting body at a location offset from the second end of the through hole; and
a cover sealingly attachable to the first end of the through hole, the cover including a portion extending into an intersection of the through hole and the first passageway, the portion having an end that provides a register surface for attachment of a tube to the fitting, the portion having an aperture that prevents blockage between the base port and the second end of the through hole.

2. The fitting of claim 1, wherein the seal is positioned within a circumferential slot within the fitting body.

3. The fitting of claim 1, wherein the cover comprises a threaded plug and an o-ring seal adjacent threads of the plug.

4. The fitting of claim 1, wherein the cover comprises a plate with threaded fasteners, and an o-ring seal mounted on the plate.

5. The fitting of claim 1, wherein the cover comprises a sensor.

6. A fitting assembly comprising:
a fitting body having a straight through hole and a base port, the through hole having a first end and a second end, the base port connected to the through hole by a first passageway generally perpendicular to the through hole;
a tube having a first end and a second end, each of the first end and the second end of the tube having an outer diameter smaller than the through hole, wherein the first end and the second end of the tube have a same diameter;
wherein during assembly of the fitting assembly the tube is movable from a first position to an assembled position;
wherein in the first position the second end of the tube is positioned outside of the fitting body extending from the first end of the through hole with a remainder of the tube extending from the second end of the through hole;
wherein the tube is moved from the first position to the assembled position by moving the second end of the tube through the first end of the through hole to the assembled position with the second end of the tube positioned within the through hole;
a seal positioned in at least one of a circumferential slot in the outer diameter of the second end of the tube and a circumferential slot in the through hole of the fitting body, the seal sealing the second end of the tube to the fitting body, the tube extending from the second end of the through hole; and
a cover sealingly attached to the first end of the through hole;
one of the cover and the tube having a portion that extends into an intersection of the through hole and the first passageway, the portion having an aperture that prevents blockage between the base port and the second end of the through hole.

7. The fitting assembly of claim 6, wherein the second end of the through hole is configured to mate with a second end of the tube.

8. The fitting assembly of claim 6, wherein the though hole is positioned on a same centerline of the tube.

9. The fitting assembly of claim 6, wherein the cover comprises a threaded plug and an o-ring seal adjacent threads of the plug.

10. The fitting assembly of claim 6, wherein cover comprises a plate with threaded fasteners, and an o-ring seal mounted on the plate.

11. The fitting assembly of claim 6, wherein the first end of the tube has a smaller diameter projection having a hole therein to promote fluid passage through the first passageway.

12. The fitting assembly of claim 6, wherein the cover comprises a sensor.

13. A cylinder assembly comprising:
a cylinder body having a first fluid port;
a manifold having a first fluid port; and
a first fitting assembly comprising a first fitting body having a through hole and a base port connected to the first fluid port of the cylinder body, the through hole having a first end and a second end, a first tube having a first end and a second end, the first tube having an outer diameter smaller than the through hole and the first end and the second end of the first tube have a same diameter,
wherein during assembly of the fitting assembly the tube is movable from a first position to an assembled position;
wherein in the first position the second end of the tube is positioned outside of the fitting body extending from the first end of the through hole with a remainder of the tube extending from the second end of the through hole;
wherein the tube is moved from the first position to the assembled position by moving the second end of the tube through the first end of the through hole to the assembled position with the second end of the tube positioned within the through hole;
the second end of the first tube sealing in the first fitting body, the first tube extending from the second end of the through hole of the first fitting body with the first end of the first tube sealingly mating with the first fluid port of the manifold, and a first cover sealingly attached to the first end of the through hole of the first fitting body, the first fitting assembly fluidly connecting the first fluid port of the cylinder to the first fluid port of the manifold.

14. The cylinder assembly of claim 13, wherein:
the cylinder body has a second fluid port;
the manifold has a second fluid port;
and further comprising a second fitting assembly comprising a second fitting body having a through hole and a base port connected to the second fluid port of the cylinder body, the through hole having a first end and a second end, a second tube having a first end and a second end, the second tube having a geometry allowing the first end of the second tube to pass through the through hole of the second fitting body, the second end of the second tube sealing in the second fitting body, the second tube extending from the second end of the through hole of the second fitting body with the first end of the second tube sealingly mating with the second fluid port of the manifold, a second cover sealingly attached to the first end of the through hole of the second fitting body, the second fitting assembly fluidly connecting the second fluid port of the cylinder to the second fluid port of the manifold.

15. The cylinder assembly of claim 14, further comprising a motor and a fluid reservoir attached to the manifold.

16. The cylinder of claim 14, wherein at least one of the first cover or the second cover comprises a sensor.

17. The cylinder assembly of claim 13, wherein the cover comprises a sensor.

* * * * *